March 23, 1926.  E. FERNHOLTZ  1,577,902
BLOCK OR BRIQUETTE OF LIGNITE AND METHOD OF MAKING THE SAME
Filed Dec. 22, 1924
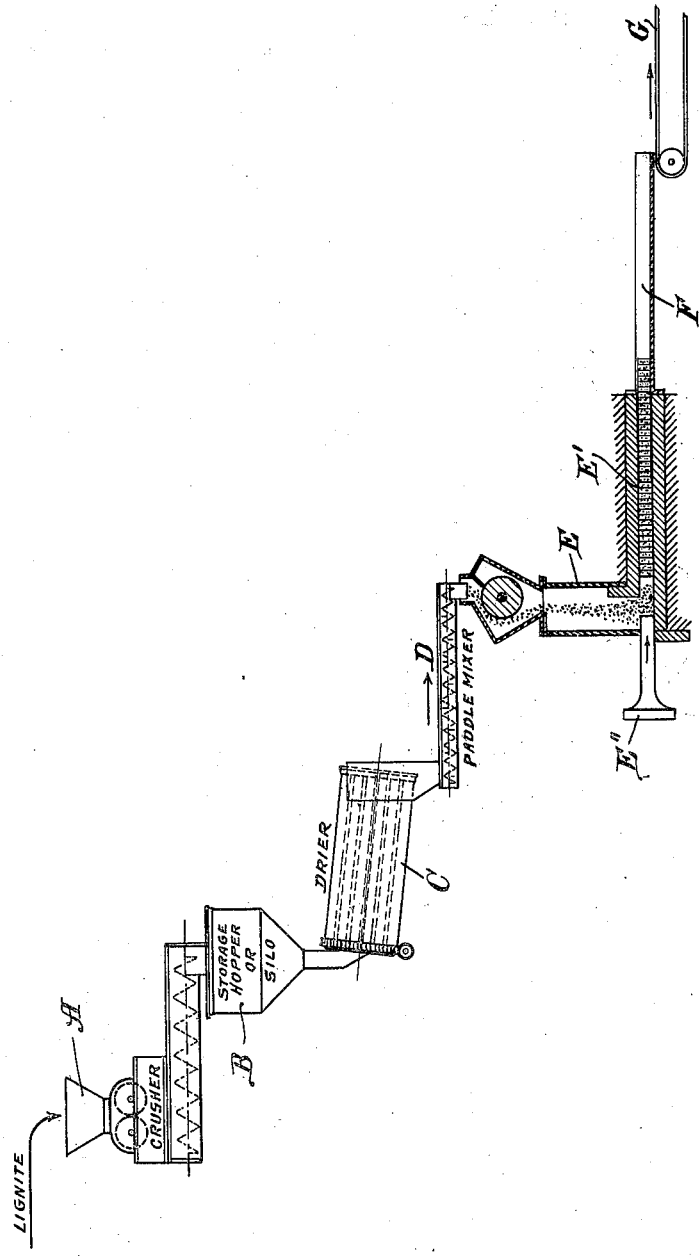
WITNESS
INVENTOR
EMIL FERNHOLTZ
BY
— ATTORNEYS Patented Mar. 23, 1926.

1,577,902

UNITED STATES PATENT OFFICE.

EMIL FERNHOLTZ, OF LOS ANGELES, CALIFORNIA, ASSIGNOR TO FERNHOLTZ MACHINERY COMPANY, OF LOS ANGELES, CALIFORNIA, A CORPORATION OF CALIFORNIA.

BLOCK OR BRIQUETTE OF LIGNITE AND METHOD OF MAKING THE SAME.

Application filed December 22, 1924. Serial No. 757,473.

*To all whom it may concern:*

Be it known that I, EMIL FERNHOLTZ, a citizen of the United States, residing at Los Angeles, in the county of Los Angeles, State of California, have invented new and useful Improvements in Blocks or Briquettes of Lignite and Methods of Making the Same, of which the following is a specification.

The object of my invention is to provide a simple and inexpensive process whereby lignite fuel can be formed into blocks that retain their shape during the combustion period,- thereby bringing them into a large field of fuel usefulness, and that, too, without the use of binders or other briquetting materials. It may be said in passing that the ordinary methods of briquetting with binders do not apply to lignite coals. Briquettes so made disintegrate in the fire in exactly the same way as do the lignites in their raw state, and it is necessary therefore in processing such fuels to employ a process which will change the chemical interrelation of its components.

In order that it may be clearly understood to what material this invention applies, the following definition of the term of lignite is supplied.

Lignite is carbonaceous material which has not as yet suffered a sufficient change from geological metamorphosis to be considered as coal. Technically, the lignites of the United States have been classified by Marius Campbell as that carbonaceous material found in beds similar to coal in which the carbon-hydrogen ratio varies from 11.2:1 to 9.3:1; that is to say the amount of carbon is approximately ten times the amount of hydrogen figured by weight in a unit mass of material. Lignites are characterized in their combustion by a rending action caused by the rapid evolution of hydrocarbons and steam which results in a disintegration of the masses or blocks into finely comminuted material. This material in such shape clogs the grates, cutting off the draft, and rendering continuous combustion impossible. As a result vast beds of lignite in our western and southern States are lying useless, or practically so, in districts that frequently suffer from a fuel shortage as at the present time.

It is in the proper handling of this lignite material that my invention resides. In order to obtain a successful result, a series of inter-related conditions must be taken into consideration. For example, most lignites contain a very large proportion of water. If that water is allowed to remain in the material, its presence will present almost insuperable obstacles during subsequent treatments. If this moisture is, however, removed by merely heating the lignite, a substantial quantity of the available volatile and combustible matter contained in the lignite hydrocarbons is likely to be driven off. It is therefore necessary to conduct the drying operation under special conditions of control. Even where these special conditions prevail, there will be an irregularity of result unless the material, before it is subjected to the drying operation, is rendered as homogeneous as possible with respect to the distribution of moisture and bituminous matter. Then again, assuming that the drying operation has been satisfactorily carried out, the consolidation of the lignite particles into enduring masses or briquettes will be frustrated, unless certain precautions are taken with respect to the molding operation and even after the molding is completed everything that had been thus far accomplished can be lost by a failure to observe certain conditions during the final stage wherein the briquettes or blocks acquire a permanent set. On the other hand, the final treatments may be perfectly applied, but if the antecedent molding and drying treatments have not been properly carried out, the result will not be satisfactory. In other words, the present invention depends upon the proper correlation of a series of separate steps, each of which is dealt with upon the basis of accomplishing a single final result. An apparatus suitable for carrying out my improved process is shown diagrammatically in the accompanying drawings. A indicates a crusher, B a storage hopper or silo, C a drier of the type referred to below, D a carrier or conveyor which also acts as a mixer, and as a cooler, E a briquette machine having a mold E' and a ram E'', F a cooling channel connected in its said mold, and G a belt or other conveyor.

In order that all subsequent steps in my process shall be facilitated and especially the removal of moisture by my drying process, I arrange for crushing or pulverizing the run-of-mine supply of lignite as it comes to the plant. The crushing should comminute the lignite into particles of about six mesh to lower—this being a state of material suited both for crushing and for subsequent treatment.

From the crusher A, the lignite is carried to a storage hopper or silo B, which serves as a "temperer" wherein an equalizing distribution of the moisture takes place by means of capillary and osmotic pressure. In the same way, evolved bituminous matter realized by the crushing will similarly distribute itself, and after a short "tempering" period (about one and one-half hours) the material is ready for the drier C. The distribution or homogenization of the material takes place automatically, simply by allowing the material to stand.

Ordinary drying methods cannot be used in the elimination of excess moisture from lignites. The carbon-hydrogen ratio is very low—indicating the presence of large quantities of explosive carbon-hydrogen gases. If direct methods of fire drying are used, involving high temperatures under comparatively lax control, there is danger from explosion and fire. I have found that if the temperature be regulated to a point just above the boiling point of water, the moisture and a minimum of volatile matter will be removed from the lignite, and that, too, under conditions that are relatively safe because the mixture of water vapor evolved and the light hydrocarbons that escape is entirely safe and nonexplosive. At this point, therefore, I pass the material through an apparatus C known as an indirect steam drier and consisting of a plurality of tubes, running longitudinally and encased in a large drum—the entire apparatus being designed to rotate slowly on its longitudinal axis. The lignite, ground and "tempered", is passed through the tubes and the main body of the drum is filled with steam at a temperature just above the condensation point. The rotation is adjusted so that when the lignite is discharged a sufficient amount of the moisture has been removed and the lignite has been dried to about 15% moisture. Provision is made in the apparatus for the escape of the evaporated moisture and other evolved products.

Immediately upon being discharged from the drier C, the hot fluxed mix is carried in devices D such as conveyors, paddle mixers or screw conveyors through a period of time to allow for cooling and there should be sufficient cooling time to bring the temperature down to between 80° and 90° F. It is essential now that the mix travel in a carefully proportioned stream, and, therefore, a paddle mixer or similar device is a necessary adjunct to the process at this point. From the paddle mixer, the mix, now cooled, "tempered", and dried to approximately 15% moisture, is passed to a briquette machine E similar to that described in my Patent No. 952,960 of March 22, 1910 or No. 1,448,339 of March 13, 1923. In this device the material passes through a mold E′, open at both ends—the ejection opening being smaller than the entrance. A centrally arranged ram E″ reciprocates in the passage way, striking rapid and tremendous blows upon successive charges on uncompressed material. These charges are thereby driven against previously compressed charges. The passage way, being constricted, resists the movement of the material with a high degree of friction and sufficient power must be available to drive the material forward the length of the stroke. The heat generated by the friction is sufficient to melt the bitumen and the heat and pressure seems to bring about an action between undecomposed cellulose remaining in the lignite and the small proportion of water remaining in the mix. This action is apparently that which is known as the hydrolysis of cellulose. Hydrolyzed cellulose, combined with the melted bitumen, forms a combination binder of great strength and cohesion. Whatever may be the correct scientific explanation of what goes on chemically, the fact is that provided the material at this stage does not contain excessive moisture and the heat and pressure conditions are properly installed, the resultant briquettes will possess the requisite strength, stability and resistance against bursting and disintegration during storage, transportation or combustion.

The degree of constriction in the mold is a matter of material importance and I have discovered that the amount of constriction of the mold necessary to produce good results is a function of the amount of bitumen in the original lignite. The amount of bitumen may be considered as the proportion of material in the lignite soluble in carbon bisulphide. For example, I have found that if the proportion of the lignite which is soluble in carbon bisulphide amounts to 1½%, the tangent of the constriction angle would be larger than if the soluble portion is 2%, in which latter case the tangent of the angle would be smaller. Those skilled in the art will readily be able to proceed along the most favorable lines.

Thus, if a given lignite deposit will produce satisfactory briquettes according to this process and said lignite contains 2% of soluble bitumen and the briquetting or extrusion press is then employed for lignite containing but 1½% solubles, the constriction in the exit orifice will be correspondingly accentuated and sufficient power must be allowed in order to overcome the increased resistance. Failure to observe these conditions has been to a large extent responsible for the lack of success of the art in coping with the problem of briquetting American lignites.

Each stroke of the machine has formed a briquette. The briquettes, however, immediately after forming are hot and fragile. It is necessary that they be given the opportunity to "set" into hard and firm briquettes without undue handling or strain. For this purpose, I provide a channel F which is in effect a continuation of the constricted mold with the upper side open to the atmosphere. There is sufficient power in the press to push the briquettes contained in this channel forward the thickness of one briquette each stroke. At the end of about 100 feet of travel, in this cooling channel, the briquettes are hard and firm and can be dumped on a conveyor belt G or other device for carrying them to storage and sales. It is well that they be put in storage for a short period so that the "set" may be more permanent. It will be found that these briquettes are hard in the fire, strong in handling, and can be made at a cost well below the price the market is willing to pay for them.

To summarize, therefore, in operation I pass lignite through a crusher or pulverizer; I preferably permit the crushed lignite to "temper" in a silo or "tempering" hopper; I remove the moisture by indirect contact with steam just above condensation temperature; cool the mix, by travel, to between 80° and 90° F.; arrange for equable feeding by a screw conveyor or paddle mixer; press into briquettes in a constricted mold type of extrusion press and, finally, arrange for the cooling and hardening of the briquetted lignite in a comparatively long cooling channel prior to shipment.

I claim:

1. The process of making blocks or briquettes of lignite which consists in crushing the lignite into comparatively small particles, tempering the crushed lignite by storage of limited duration, treating the tempered lignite for moisture removal by exposure to indirect heat derived from steam, cooling and simultaneously mixing and feeding the dry material in such a manner that the same arrives in uniform condition and mass at a mold of the extrusion type, forcing the material through such constricted mold under high pressure until bitumen contained in the material is melted and a strong water-proof binder is formed in the material as it leaves the mold, depositing the extruded briquettes from the mold orifice into a channel under conditions which avoid shocks in the freshly briquetted material and then gently feeding the briquettes forward along said channel until the briquettes have set and cooled.

2. In the process of making blocks or briquettes of lignite without extraneous binder, the sequence of steps whereby the lignite is crushed to comparatively small particles, tempered by short storage, treated with indirect steam for moisture removal, cooled and prepared for uniform feeding into a mold, molded in a constricted mold under high pressure, the constriction and power being adjusted to the soluble bitumen content of the material so that sufficient bitumen contained in the material is melted under condistions favorable to the hydrolysis of the collulosic ingredient of the material, depositing the briquetted material directly from the exit orifice of the mold into one end of a long channel, whose bed at said point is in effect a continuation of the lower edge of the exit orifice of the mold and in said channel exposing the freshly formed briquettes to a cooling medium until the briquettes have set.

3. The process of making blocks or briquettes of lignite which consists in crushing the lignite into comparatively small particles, treating the crushed lignite for moisture removal by exposure to indirect heat derived from steam, cooling and simultaneously mixing and feeding the dry material in such a manner that the same arrives in uniform condition and mass at a mold of the extrusion type, ascertaining the percentage of soluble bitumen in the lignite, shaping the constriction of the mold orifice in accordance with such ascertained percentage, forcing the material through such constricted mold under high pressure until bitumen contained in the material is melted and a strong water-proof binder is formed in the material as it leaves the mold, depositing the extruded briquettes from the mold orifice into a channel under conditions which avoid shocks in the freshly briquetted material and then gently feeding the briquettes forward along said channel until the briquettes have set and cooled.

4. The process of making blocks or briquettes of lignite which consists in crushing the lignite into comparatively small particles, tempering the crushed lignite by storage of limited duration, treating the tempered lignite for moisture removal by exposure to indirect heat derived from steam, cooling and simultaneously mixing and feeding the dry material in such a manner that the same arrives in uniform condition and mass at a mold of the extrusion type, ascertaining the percentage of soluble bitumen in the lignite, shaping the constriction of the mold orifice in accordance with such ascertained percentage, forcing the material through such constricted mold under high pressure until bitumen contained in the material is melted and a strong water-proof binder is formed in the material as it leaves the mold, depositing the extruded briquettes from the mold orifice into a channel under conditions which avoid shocks in the freshly briquetted material and then gently feeding the briquettes forward along said channel until the briquettes have set and cooled.

5. A lignite briquette corresponding in its properties and characteristics to the product formed by crushing the lignite into comparatively small particles, tempering the crushed lignite by storage of limited duration, treating the tempered lignite for moisture removal by exposure to indirect heat derived from steam, cooling and simultaneously mixing and feeding the dry material in such a manner that the same arrives in uniform condition and mass at a mold of the extrusion type, ascertaining the percentage of soluble bitumen in the lignite, shaping the constriction of the mold orifice in accordance with such ascertained percentage, forcing the material through such constricted mold under high pressure until bitumen contained in the material is melted and a strong water-proof binder is formed in the material as it leaves the mold, depositing the extruded briquettes from the mold orifice into a channel under conditions which avoid shocks in the freshly briquetted material and then feeding the briquettes forward along said channel until the briquettes have set and cooled.

In testimony whereof I have hereunto set my hand.

EMIL FERNHOLTZ.